Patented Oct. 30, 1934

1,979,145

UNITED STATES PATENT OFFICE 1,979,145

PROCESS OF PRODUCING POLYNAPHTHYL ETHERS

Miles A. Dahlen and Crayton K. Black, Wilmington, Del., and William L. Foohey, Pennsgrove, N. J., assignors to E. I. du Pont de Nemours & Company, Wilmington, Del., a corporation of Delaware No Drawing. Application July 14, 1933, Serial No. 680,501

9 Claims. (Cl. 260—150)

This invention relates to polynaphthyl ethers, and more particularly to naphthyl ethers of polyhydric alcohols or ether-alcohols of the general formula:

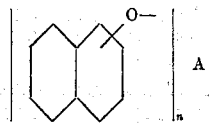

in which A represents a radical derived from an aliphatic hydrocarbon or aliphatic hydrocarbon ether, and $n$ represents an integer larger than one.

The synthesis of ethers of the above general formula has been effected by the condensation of a metallic salt of alpha- or beta-naphthol with certain halogenated aliphatic hydrocarbons or aliphatic hydrocarbon ethers in the presence of an organic solvent such as ethyl alcohol. One such procedure involves dissolving sodium in absolute ethyl alcohol, then adding a naphthol and heating the mixture with beta:beta'-dichlorodiethyl-ether on a water bath. When the reaction is complete, the precipitated sodium chloride is filtered off, washed with a little alcohol and the filtrate distilled to recover the product.

This type of process leaves much to be desired from the standpoint of commercial operation on account of the high cost of organic solvents and the hazards of handling inflammable organic liquids such as ethyl alcohol. Furthermore, such a process is undesirable since it involves difficulties in the isolation of the condensation products and the recovery of the unchanged naphthol employed as a starting material, as well as the recovery of the organic solvents.

It is an object of this invention to provide a new and improved process for the production of polynaphthyl ethers. Another object is to produce polynaphthyl ethers by a process which is adapted to the production of such compounds economically on a large scale. A further object is the provision of a process for the production of polynaphthyl ethers by a reaction which proceeds smoothly and easily to produce the desired products in good yields and in a high state of purity. A still further object is the provision of a process for the production of polynaphthyl ethers characterized by the fact that the products may be readily separated and any unchanged starting materials may be readily recovered. Other objects will appear hereinafter.

These objects are accomplished according to this invention whereby polynaphthyl ethers are produced by heating a naphthol and an aliphatic glycol or ether-alcohol in the presence of sulfuric acid. The reaction may be described by the following equation:

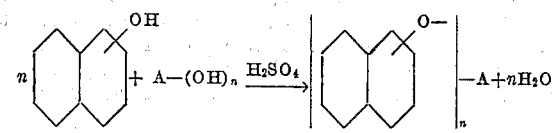

in which A represents an aliphatic hydrocarbon or aliphatic hydrocarbon ether radical, and $n$ represents an integer larger than one.

The process is preferably carried out by carefully adding the sulfuric acid to the glycol or ether-alcohol while cooling the mass, if necessary, to prevent decomposition of the sulfuric acid esters thus formed, then adding the naphthol and heating the reaction mixture, with agitation, under suitable conditions. When the condensation process is complete, recovery of the products is preferably effected by cooling the reaction mixture, diluting it with water and/or ice, and adding sodium hydroxide or other similar alkali to neutralize the acidity and dissolve any unchanged naphthol. The product is normally insoluble and may be separated by filtration. It may then be purified by any convenient process such as crystallization from a suitable solvent.

The condensation reaction proceeds smoothly; the product is obtained in a good yield and in a good state of purity; and the isolation of the products and unchanged raw materials is readily effected.

The invention will be further understood, but is not limited, by the following examples, in which the parts are by weight.

*Example I*

Two hundred parts of sulfuric acid of 98% strength were carefully added to 124 parts of ethylene-glycol. Five hundred eighty parts of beta-naphthol were then added, and the pasty mass heated to 120° C. in a vessel fitted with a reflux condenser and agitator. The paste soon thinned to a viscous liquid, which was stirred without difficulty. After six hours heating at 120° C., the hot mass was drowned in a solution of 200 parts of sodium hydroxide in 600 parts of water. The precipitated product was isolated by filtration. The filter cake was washed with dilute sodium hydroxide solution until free from unreacted beta-naphthol, and then with water to displace all mother liquor. The material was dried and then purified by crystallization from xylene. The product, ethylene-glycol-di-(beta-naphthyl)-ether, of the formula:

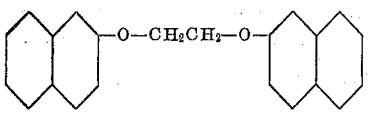

was a white crystalline solid, melting when pure at 217° C.

*Example II*

The process of Example I was carried out except that 212 parts of diethylene-glycol were substituted for the 124 parts of ethylene-glycol.

The white crystalline product obtained melts, when pure, at 122° C. Its formula is:

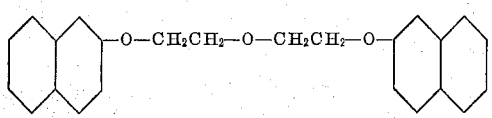

*Example III*

The procedure of Example I was followed except that 152 parts of propylene-glycol were substituted for the 124 parts of ethylene-glycol. The white crystalline product obtained from this reaction melts, when pure, at 152° C. Its formula is:

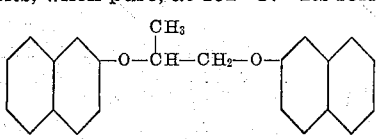

*Example IV*

The process of Example I was effected except that 580 parts of alpha-naphthol were substituted for the 580 parts of beta-naphthol. The white crystalline compound obtained by this condensation melts, when pure, at 127.5° C. Its formula is:

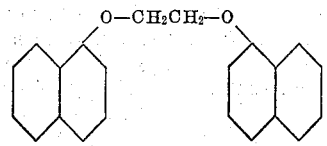

According to procedures similar to those described in the examples, numerous other glycols and ether-alcohols may be converted to their naphthyl ethers. As specific examples of further reactions of a similar nature which may be effected in accordance with the invention may be mentioned the reaction of alpha- or beta-naphthol with any one of the following glycols and ether-alcohols:

Trimethylene-glycol
Tetramethylene-glycol
Glycerine
Erythritol
Di-glycerine
Triethylene-glycol
Beta:beta'-dihydroxy-di-isopropyl-ether
Gamma:gamma'-dihydroxy-di-propyl-ether
Di-(beta:gamma-dihydroxy-propyl)-ether Substituted naphthols, preferably containing substituents such as alkyl (methyl, ethyl, isopropyl, butyl and higher alkyl radicals), alkoxy (methoxy, ethoxy, butyloxy and higher alkoxy radicals), and halogens (e. g., chlorine and bromine), may similarly be reacted with any of the glycols or ether-alcohols mentioned.

The concentrations of the reacting materials in the reaction mixture, the temperature of condensation, the time of condensation and the rate of agitation are subject to variation, depending largely upon the nature of the specific reaction involved. The concentration of sulfuric acid in the reaction mixture and the temperature of condensation should preferably be such that substantial decomposition of the reactants or products does not occur. In general, it is desirable to employ sulfuric acid having a concentration of at least 50%, and preferably within the range of 85% to 100%.

While the temperature may vary within relatively wide limits, ordinarily good results have been obtained in carrying out the variations at a temperature of at least 75° C., and preferably within the range of 75° C. to 200° C.

The pressure may be atmospheric, sub-atmospheric or super-atmospheric. The amount of naphthol is preferably at least the theoretical amount required for the desired reaction, and usually it has been found desirable to employ somewhat of an excess. Thus, in the production of di-naphthyl ethers, while the theoretical proportions of naphthol and glycol or ether-alcohol correspond to approximately two moles of naphthol per mole of glycol or ether-alcohol, it is preferable to employ about 1% to 10% excess of the naphthol.

The amount of sulfuric acid is subject to variation, dependent upon such factors as the concentration of the acid and the temperature of operation but, in general, desirable results have been obtained in the use of about one to three moles of 85% to 100% sulfuric acid per mole of glycol or ether-alcohol.

As indicated by Example I, recovery of the product is preferably effected by making the reaction mixture sufficiently alkaline to form a water-soluble naphtholate. Any alkali adapted to form a water-soluble naphtholate by reaction with the unchanged naphthol may be employed. Examples of such alkalis are the alkali metal hydroxides, such as, for example, sodium hydroxide and potassium hydroxide.

The products of the invention have a wide variety of uses, particularly in the production of dyes. The process offers many advantages and overcomes certain disadvantages of previously known processes. The products are obtained in a good state of purity and in relatively high yields. The necessity for the recovery of solvents and the hazards attending the use of organic solvents, such as ethyl-alcohol, in the reaction are avoided. Since the products are normally insoluble in the diluted reaction mixture, they are easily separated by filtration in contrast with processes in which organic solvents are employed and distillation is resorted to for the recovery of the products. The recovery of unchanged naphthols which are expensive raw materials is readily effected. Sulfuric acid, the principal additional material required to bring about the reaction, is a substance of low cost and the same is true of many of the other starting materials. The process of the invention is, therefore, particularly attractive from an economical point of view.

As many apparently widely different embodiments of this invention may be made without departing from the spirit and scope thereof, it is to be understood that we do not limit ourselves to the specific embodiments thereof except as defined in the following claims.

We claim:

1. The process of producing polynaphthyl ethers which comprises heating together, in the presence of sulfuric acid, a naphthol and a compound selected from the group consisting of aliphatic glycols and polyhydroxy aliphatic ether-alcohols.

2. The process of claim 1, in which the reaction is carried out at a temperature within the range of about 75° C. to about 200° C.

3. The process of claim 1 in which an excess of naphthol is used over that theoretically required to form a dinaphthyl-ether.

4. The process of producing a product having the formula:

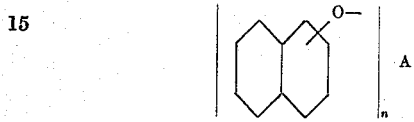

which comprises heating together, in the presence of sulfuric acid, a compound having the formula:

with a compound having the formula A—(OH)$_n$, in which A represents an aliphatic hydrocarbon radical, and $n$ represents an integer larger than one.

5. The process of producing a product having the formula:

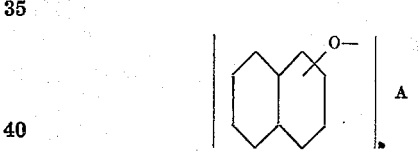

which comprises heating together, in the presence of sulfuric acid, a compound having the formula:

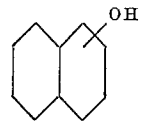

with a compound having a formula A—(OH)$_n$, in which A represents an aliphatic hydrocarbon either radical, and $n$ represents an integer larger than one.

6. The process of producing ethylene-glycol-di-(beta-naphthyl)-ether which comprises heating together, in the presence of sulfuric acid, beta-naphthol and ethylene-glycol.

7. The process of claim 6, in which the reaction is effected at a temperature of about 120° C.

8. The process of producing ethylene-glycol-di-(beta-naphthyl)-ether which comprises adding concentrated sulfuric acid to ethylene-glycol, heating the resultant product with beta-naphthol at a temperature of about 120° C., then making the reaction product alkaline with an alkali adapted to form a water-soluble naphthol, and recovering the insoluble ethylene-glycol-di-(beta-naphthyl)-ether.

9. The process of producing ethylene-glycol-di-(beta-naphthyl)-ether which comprises adding about 200 parts of 98% sulfuric acid to about 124 parts of ethylene-glycol, then mixing the resultant product with about 580 parts of beta-naphthol, heating the mixture at a temperature of about 120° C. under reflux for about six hours, then adding the resultant product to a solution of about 200 parts of sodium hydroxide in 600 parts of water, and recovering the ethylene-glycol-di-(beta-naphthyl)-ether.

MILES A. DAHLEN.
CRAYTON K. BLACK.
WILLIAM L. FOOHEY.